(12) United States Patent
Chen

(10) Patent No.: US 7,438,258 B2
(45) Date of Patent: Oct. 21, 2008

(54) REEL DEVICE FOR WINDING AN ELECTRICAL CABLE THEREON

(76) Inventor: Chi-Wen Chen, No. 105, Alley 27, Lane 143, Chun-Kung Rd., Taipei City (TW)

( * ) Notice: Subject to any disclaimer, the term of this patent is extended or adjusted under 35 U.S.C. 154(b) by 365 days.

(21) Appl. No.: 11/334,516

(22) Filed: Jan. 18, 2006

(65) Prior Publication Data
US 2007/0176045 A1   Aug. 2, 2007

(51) Int. Cl.
B65H 75/14   (2006.01)
(52) U.S. Cl. .................. 242/614; 191/12.2 R; 191/12.4
(58) Field of Classification Search ................ 242/614, 242/407.1, 398, 389, 600; 191/12.2 R, 12.4
See application file for complete search history.

(56) References Cited

U.S. PATENT DOCUMENTS

| | | | | |
|---|---|---|---|---|
| 3,837,448 A * | 9/1974 | Hagstrom | .................. | 191/12.4 |
| 3,838,830 A * | 10/1974 | Pettit | .......................... | 242/395 |
| 4,114,736 A * | 9/1978 | Scherenberg | .............. | 191/12.4 |
| 4,282,954 A * | 8/1981 | Hill | ........................... | 191/12.4 |
| 4,338,497 A * | 7/1982 | Drew | ........................ | 191/12.4 |
| 4,520,239 A * | 5/1985 | Schwartz | ................... | 191/12.4 |
| 4,685,634 A * | 8/1987 | Schwartz | ................. | 242/405.3 |
| 5,657,841 A * | 8/1997 | Morvan | ..................... | 191/12.4 |
| 5,782,412 A * | 7/1998 | Plantz et al. | ................ | 239/197 |
| 5,797,424 A * | 8/1998 | Tisbo et al. | ............ | 137/355.27 |
| 6,199,786 B1 * | 3/2001 | Lessard et al. | .............. | 242/406 |
| 6,223,871 B1 * | 5/2001 | Steffen | ...................... | 191/12.4 |
| D464,624 S * | 10/2002 | Shim | ...................... | D13/137.4 |
| 7,114,603 B2 * | 10/2006 | Lai | ............................. | 191/12.4 |
| 2002/0096592 A1 * | 7/2002 | Chuang | ..................... | 242/397 |

\* cited by examiner

Primary Examiner—J. Allen Shriver
Assistant Examiner—Juan J Campos
(74) Attorney, Agent, or Firm—Brinks Hofer Gilson & Lione

(57) ABSTRACT

A reel device includes a spool unit and a handle unit. The spool unit includes a tubular winding body and a pair of first and second flanges. The winding body has opposite first and second open ends, each of which has a peripheral edge. Each of the first and second flanges extends radially and outwardly from the peripheral edge of a respective one of the first and second open ends of the winding body. The handle unit is disposed in and is coupled rotatably to the winding body. The spool unit is rotatable relative to the handle unit in a first angular direction, and in a second angular direction opposite to the first angular direction.

4 Claims, 5 Drawing Sheets

REEL DEVICE FOR WINDING AN ELECTRICAL CABLE THEREON

BACKGROUND OF THE INVENTION

1. Field of the Invention

This invention relates to a reel device, more particularly to a reel device including a tubular winding body, and a handle unit disposed in and coupled rotatably to the winding body.

2. Description of the Related Art

In U.S. Pat. No. 6,047,918, there is disclosed a conventional reel device that includes a spool unit mounted rotatably in a housing, and a handle unit that extends from the housing.

The aforementioned conventional reel device is disadvantageous in that it is relatively bulky. Furthermore, replacement of the electrical cable, when damaged, is inconvenient to conduct.

SUMMARY OF THE INVENTION

Therefore, the object of the present invention is to provide a reel device that can overcome the aforesaid drawbacks of the prior art.

According to the present invention, a reel device comprises a spool unit, a first electrical connector, an electrical socket, electrical cable, and a handle unit. The spool unit includes a tubular winding body and a pair of flanges. The tubular winding body defines an accommodating space therein, and has opposite first and second open ends, each of which has a peripheral edge. Each of the first and second flanges extends radially and outwardly from the peripheral edge of a respective one of the first and second open ends of the winding body. The first electrical connector is mounted on the first open end of the winding body. The electrical socket is mounted on the first open end of the winding body and is coupled electrically to the first electrical connector. The electrical cable is wound on the winding body, and has a first end portion that is terminated by a second electrical connector to be coupled electrically to the first electrical connector, and a second end portion that is terminated by an electrical plug. The handle unit is disposed in and coupled rotatably to the winding body. The spool unit is rotatable relative to the handle unit in a first angular direction so as to wind the electrical cable on the winding body, and in a second angular direction so as to unwind the electrical cable from the winding body.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
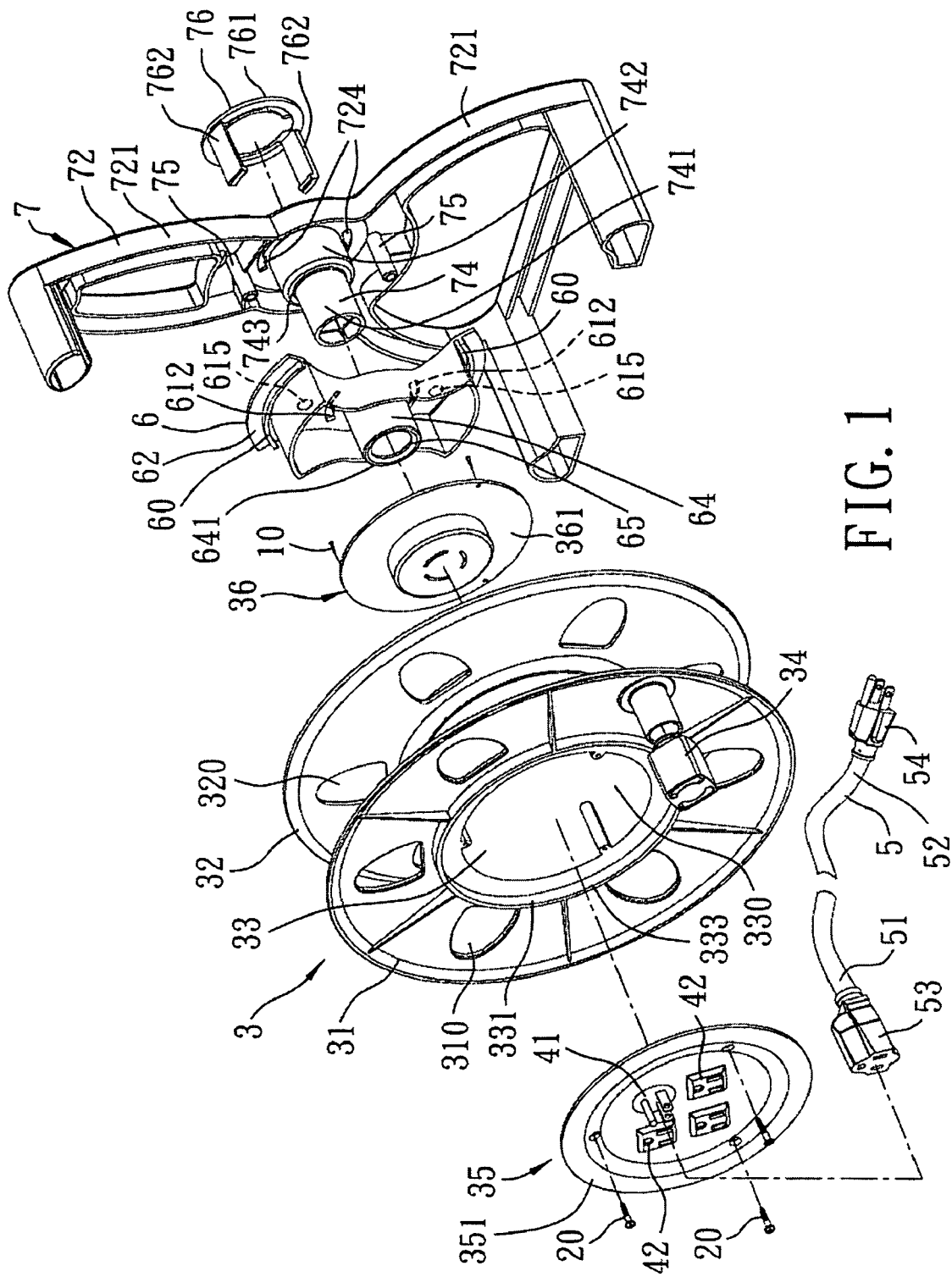
FIG. 1 is an exploded perspective view of the preferred embodiment of a reel device according to the present invention.
Figure 2:
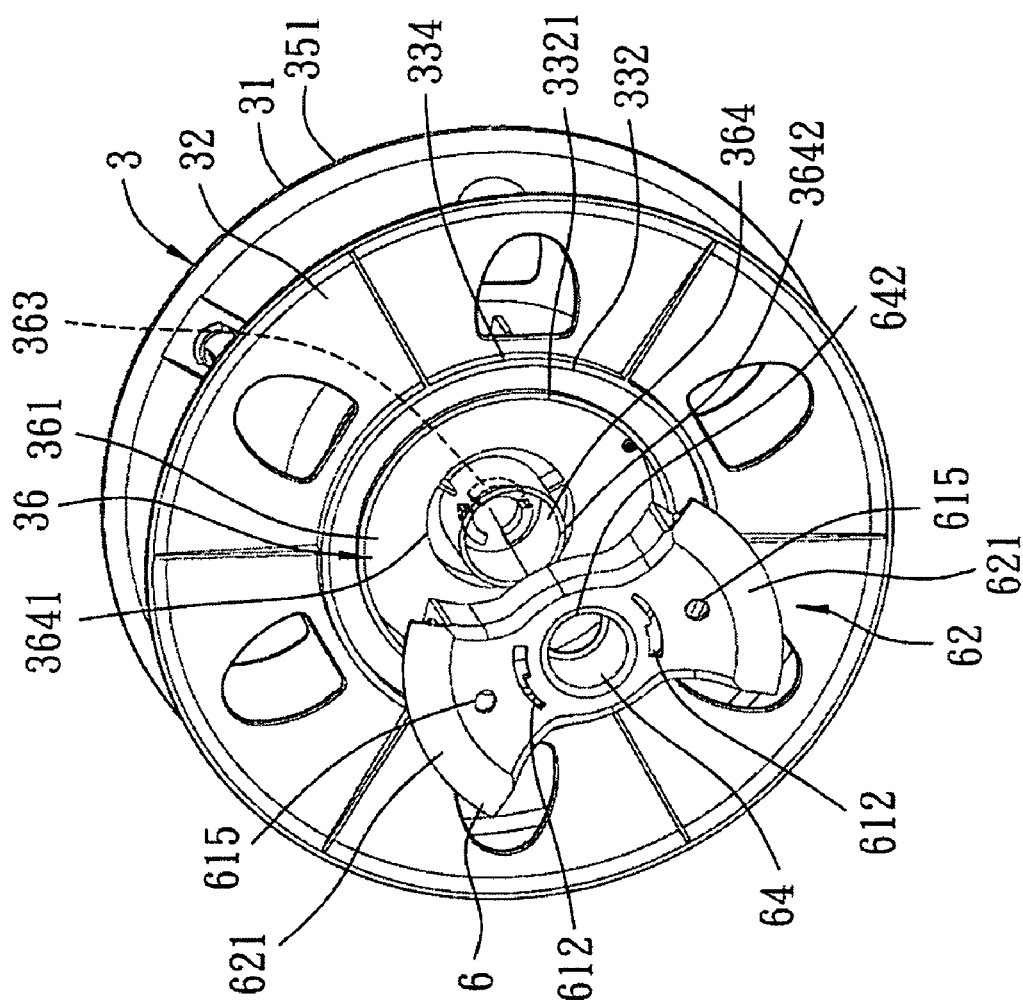
FIG. 2 is a partly exploded perspective view to illustrate a handle unit detached from a spool unit of the preferred embodiment.
Figure 3:
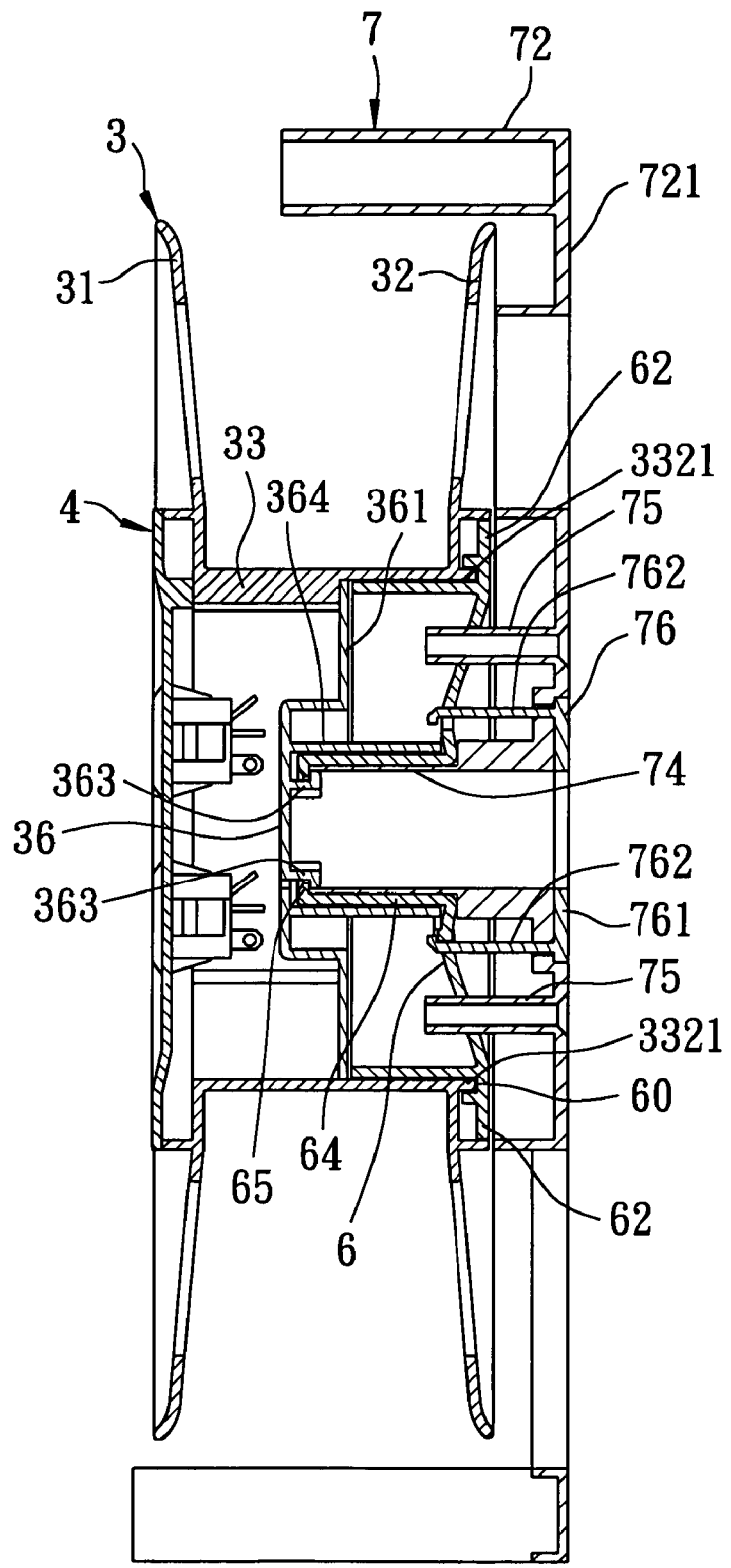
FIG. 3 is a schematic sectional view of the preferred embodiment in an assembled state.

Referring to FIGS. 1 to 3, the preferred embodiment of a reel device according to this invention is shown to include a spool unit 3, a male electrical connector 41, three electrical sockets 42, a handle unit 6, and an electrical cable 5.

The spool unit 3 includes a tubular winding body 33, and a pair of first and second flanges 31, 32. The winding body 33 defines an accommodating space 330 therein, and has opposite first and second open ends 331, 332, each of which has a peripheral edge 333, 334. Each of the first and second flanges 31, 32 extends radially and outwardly from the peripheral edge 333, 334 of a respective one of the first and second open ends 331, 332 of the winding body 33. In this embodiment, each of the flanges 31, 32 is formed with a plurality of angularly displaced through holes 310, 320.

The spool unit 3 further includes a pair of first and second cover members 35, 36. The first cover member 35 of the spool unit 3 includes a circular plate 351 that is fastened releasably to the first open end 331 of the winding body 33 with the use of a first set of screw fasteners 20. The second cover member 36 of the spool unit 3 includes a circular plate 361 and a tubular part 364. The circular plate 361 of the second cover member 36 is fastened releasably to the second open end 332 of the winding body 33 with the use of a second set of screw fasteners 10. In this embodiment, the circular plate 361 of the second cover member 36 is formed with three circumferentially extending angularly displaced engaging necks 363. The tubular part 364 of the second cover member 36 has a first end 3641 that is connected to the circular plate 361 of the second cover member 36 and that surrounds the engaging necks 363 of the circular plate 361 of the second cover member 36, and a second end 3642 that is opposite to the first end 3641 of the tubular part 364 of the second cover member 36.

The second open end 332 of the winding body 33 is formed with an annular projection 3321 that projects axially and outwardly therefrom.

The male electrical connector 41 is mounted on the circular plate 351 of the first cover member 35.

Each of the electrical sockets 42 is mounted on the circular plate 351 of the first cover member 35, and is connected electrically to the male electrical connector 41.

The handle unit 6 is disposed in the accommodating space 330 in the winding body 33 of the spool unit 3, is connected rotatably to the second cover member 36 of the spool unit 3, and is ergonomically designed to be grasped by a hand.

Figure 5:
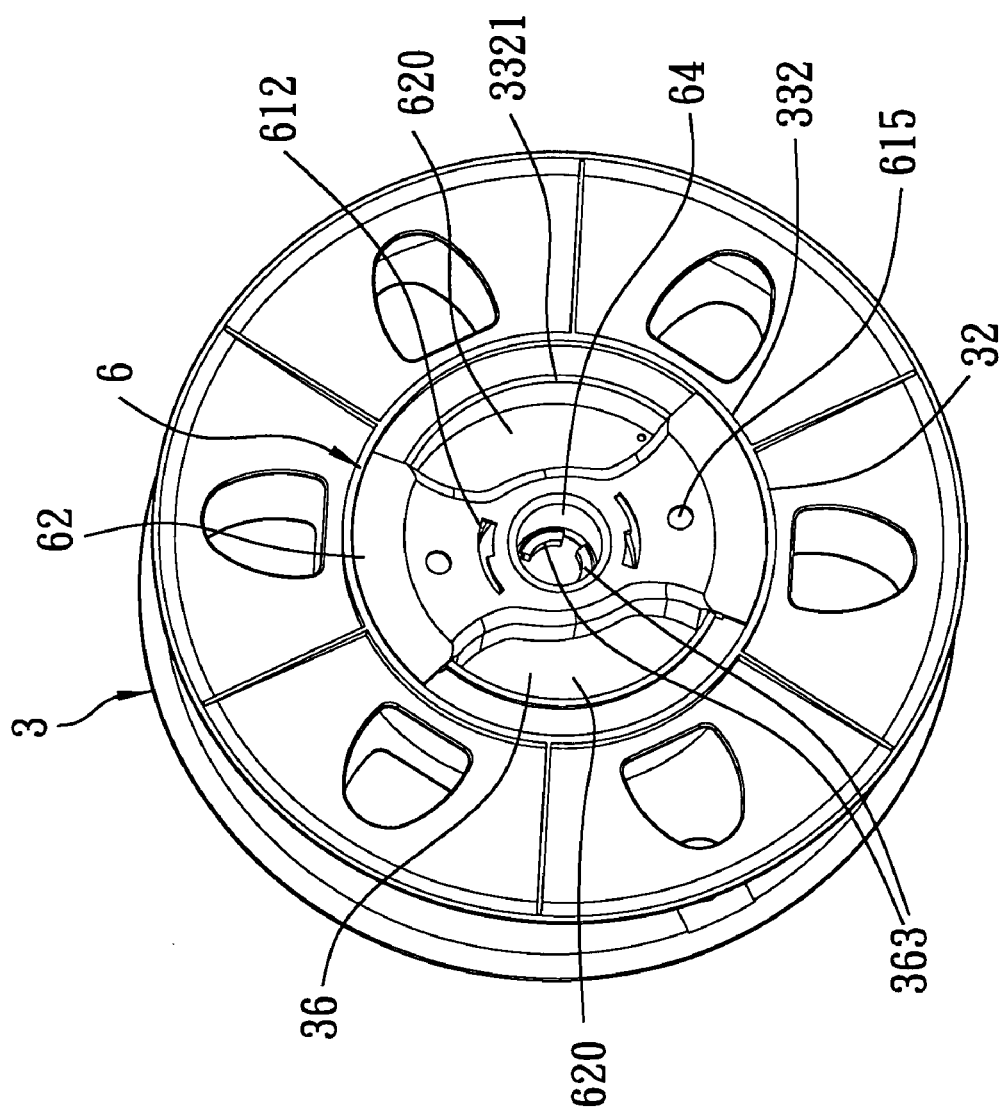
FIG. 5 is a perspective view to illustrate the handle unit when coupled rotatably to the spool unit.

In this embodiment, the handle unit 6 includes a tubular member 64 and a handle member 62. The tubular member 64 of the handle unit 6 extends into the tubular part 364 of the second cover member 36, and has opposite first and second open ends 641, 642. The first open end 641 of the tubular member 64 of the handle unit 6 is provided with an annular engaging protrusion 65 that is in snap engagement with the engaging necks 363 of the circular plate 361 of the second cover member 36. The handle member 62 of the handle unit 6 includes a pair of diametrically displaced sector parts 621, each of which extends radially and outwardly from the second open end 642 of the tubular member 64 of the handle unit 6, each of which is formed with a circumferentially extending receiving groove 60 that receives slidably the annular projection 3321 of the second open end 332 of the winding body 33, and each of which cooperates with the second open end 332 of the winding body 33 to define a grasping space 620 (see FIG. 5).

In an alternative embodiment, the engaging necks 363 of the circular plate 361 of the second cover member 36 can be disposed around the tubular part 364 of the second cover member 36. Moreover, the tubular member 64 of the handle unit 6 may be sleeved on the tubular part 364 of the second cover member 36 for engagement between the annular engaging protrusion 65 of the first open end 641 of the tubular member 64 of the handle unit 6 and the engaging necks 363 of the circular plate 361 of the second cover member 36.

The electrical cable 5 is wound on the winding body 33, and has a first end portion 51 that extends through one of the through holes 310 in the first flange 31 of the spool unit 3, and that is terminated by a female electrical connector 53 so as to connect electrically and removably to the male electrical connector 41, and a second end portion 52 that is opposite to the first end portion 51 of the electrical cable 5 and that is terminated by an electrical plug 54 so as to be connected electrically to an electrical outlet (not shown) of a commercial alternating current (AC) power source (not shown).

The reel device further includes a crank 34 that is mounted rotatably on the first flange 31 of the spool unit 3 and that is operable so as to rotate the spool unit 3 relative to the handle unit 6.

In this embodiment, the spool unit 3 is rotatable relative to the handle unit 6 in a first angular direction so as to wind the electrical cable 5 on the winding body 33, and in a second angular direction opposite to the first angular direction so as to unwind the electrical cable 5 from the winding body 33.

The reel device further includes a support unit 7 for supporting the spool unit 3 on a surface (not shown), such as the ground. In particular, the support unit 7 includes a tubular member 74, a support member 72, and a latching member 76. The tubular member 74 of the support unit 7 has a first end portion 741 that extends into the tubular member 64 of the handle unit 6, and a second end portion 742 that is opposite to the first end portion 741 of the tubular member 74 of the support unit 7. In this embodiment, the tubular member 74 of the support unit 7 is provided with a shoulder 743 that is disposed between the first and second end portions 741, 742 of the tubular member 74 of the support unit 7 and that abuts against the sector parts 621 of the handle member 62 of the handle unit 6. The support member 72 is generally inverted-Y in shape, and includes three legs 721, each of which extends radially and outwardly from the second end portion 742 of the tubular member 74 of the support unit 7. Each of the sector parts 621 of the handle member 62 of the handle unit 6 is formed with a through hole 615. The support member 72 is provided with a pair of diametrically displaced limiting pieces 75, each of which extends through the through hole 615 in a respective one of the sector parts 621 of the handle member 62 of the handle unit 6, thereby preventing relative rotation between the handle unit 6 and the support unit 7. The latching member 76 serves to latch releasably the support unit 7 to the handle unit 6. In this embodiment, each of the sector parts 621 of the handle member 62 of the handle unit 6 is further formed with a fastening hole 612. The support member 72 of the support unit 7 is formed with a pair of diametrically displaced through holes 724. The latching member 76 includes an abutting part 761 that is provided with a pair of diametrically displaced latching parts 762. The abutting part 761 of the latching member 76 of the support unit 7 abuts against the support member 72 of the support unit 7. Each of the latching parts 762 extends from the abutting part 761 of the latching member 76 of the support unit 7 and through a respective one of the through holes 724 in the support member 72, and is provided with a fastening hook that is latched to the fastening hole 612 in a respective one of the sector parts 621 of the handle member 62 of the handle unit 6, thereby latching releasably the support unit 7 to the handle unit 6.

The crank 34 is further operable so as to rotate the spool unit 3 relative to the handle unit 6 and the support unit 7.

In this embodiment, the spool unit 3 is further rotatable relative to the support unit 7 in the first angular direction so as to wind the electrical cable 5 on the winding body 33, and in the second angular direction so as to unwind the electrical cable 5 from the winding body 33.

Although the reel device of this invention is exemplified using only a single male electrical connector 41 and three electrical sockets 42, it should be apparent to those skilled in the art that the number of the male electrical connector 41 and the electrical sockets 42 may be increased or reduced as required.

Figure 4:
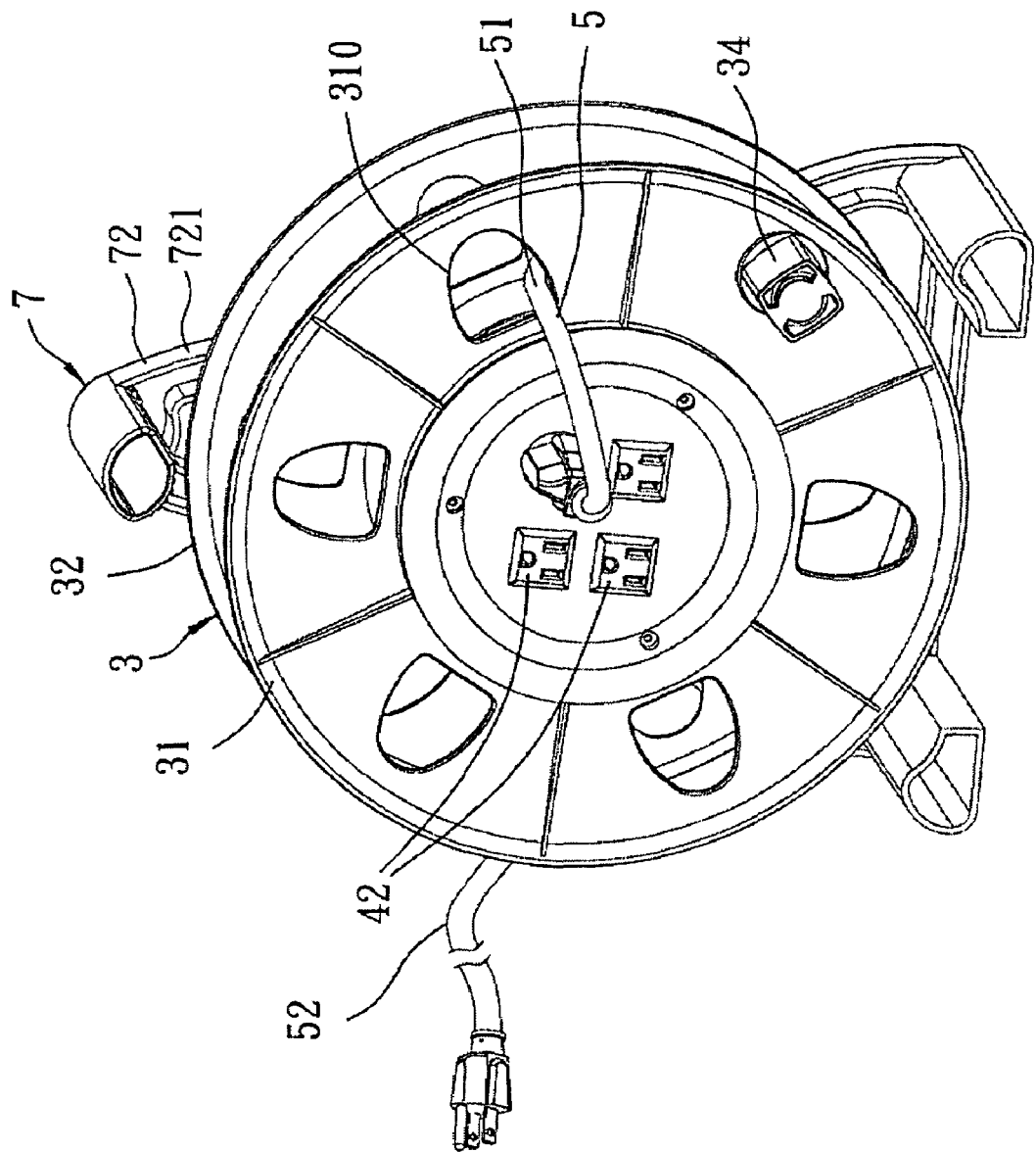
FIG. 4 is a perspective view of the preferred embodiment in the assembled state.

During assembly, with further reference to FIG. 4, the circular plate 351 of the first cover member 35 of the spool unit 3 is first fastened to the first open end 331 of the winding body 33. The circular plate 361 of the second cover member 36 is then fastened to the second open end 332 of the winding body 33. Subsequently, the tubular member 64 of the handle unit 6 is inserted into the tubular part 364 of the second cover member 36 such that the engaging protrusion 65 of the first open end 641 of the tubular member 64 of the handle unit 6 engages the engaging necks 363 on the circular plate 361 of the second cover member 36 and such that the annular projection 3321 of the second open end 332 of the winding body 33 is received in the receiving groove 60 in each of the sector parts 621 of the handle member 62 of the handle unit 6. Thereafter, the first end portion 741 of the tubular member 74 of the support unit 7 is inserted into the tubular member 64 of the handle unit 6 such that the shoulder 743 of the tubular member 74 of the support unit 7 abuts against the handle member 62 of the handle unit 6 and such that each of the limiting pieces 75 of the support member 72 of the support unit 7 extends through the through hole 615 in the respective one of the sector parts 621 of the handle member 62 of the handle unit 6. Finally, each of the latching parts 762 of the latching member 76 of the support unit 7 is inserted through the respective one of the through holes 724 in the support member 72 of the support unit 7 such that the abutting part 761 of the latching member 76 of the support unit 7 abuts against the support member 72 of the support unit 7 and such that the fastening hook of each of the latching parts 762 of the latching member 76 of the support unit 7 is latched to the fastening hole 612 in the respective one of the sector parts 621 of the handle member 62 of the handle unit 6.

The aforementioned procedure is performed in a reversed order during disassembly.

From the above description, the electrical cable 5 of the reel device of this invention can be replaced with ease and convenience. Moreover, since the handle unit 6 is disposed in and is coupled rotatably to the winding body 33 through the second cover member 36, the reel device of this invention has a physical size that is relatively small.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A reel device, comprising:
a spool unit including
a tubular winding body that defines an accommodating space therein, and that has opposite first and second open ends, each of which has a peripheral edge, a cover member that is mounted securely in said accommodating space in said winding body, said cover member of said spool unit including a circular plate that is mounted releasably in said accommodating space in said winding body and that is formed with three circumferentially extending angularly displaced engaging necks, and a tubular part that has opposite first and second ends, said first end of said tubular part of said cover member being connected to said circular plate, a pair of first and second flanges, each of which extends radially and outwardly from said peripheral edge of a respective one of said first and second open ends of said winding body;

a first electrical connector mounted on said first open end of said winding body;

an electrical socket mounted on said first open end of said winding body and coupled electrically to said first electrical connector;

an electrical cable wound on said winding body, and having a first end portion that is terminated by a second electrical connector to be coupled electrically to said first electrical connector, and a second end portion that is terminated by an electrical plug; and a handle unit disposed in said winding body and coupled rotatably to said winding body and said cover member, said handle unit including a tubular member that extends into said tubular part of said cover member, and that has opposite first and second open ends, said first open end of said tubular member of said handle unit being provided with an annular engaging protrusion that is in snap engagement with said engaging necks of said circular plate of said cover member, and a handle member that is coupled to said second open end of said tubular member of said handle unit;

wherein said spool unit is rotatable relative to said handle unit in a first angular direction so as to wind said electrical cable on said winding body, and in a second angular direction so as to unwind said electrical cable from said winding body.

2. The reel device as claimed in claim 1, wherein said handle member of said handle unit includes a pair of diametrically displaced sector parts, each of which extends radially and outwardly from said second open end of said tubular member of said handle unit, and each of which cooperates with said second open end of said winding body to define a pair of grasping spaces.

3. The reel device as claimed in claim 1, further comprising a support unit fastened releasably to said handle unit for supporting said spool unit, said spool unit being rotatable relative to said support unit in the first and second angular directions.

4. The reel device as claimed in claim 3, wherein said support unit includes a tubular member having a first end portion that extends into said tubular member of said handle unit, and a second end portion that is opposite to said first end portion of said tubular member of said support unit, a support member connected to said second end portion of said tubular member of said support unit, and a latching member having an abutting part that abuts against said support member of said support unit, and a latching part that extends from said abutting part and that is latched release to said handle member of said handle unit.

* * * * *